(12) United States Patent
Zubik et al.

(10) Patent No.: US 6,951,062 B2
(45) Date of Patent: Oct. 4, 2005

(54) METHOD AND APPARATUS FOR RESTRICTING FOREIGN OBJECTS FROM ENTERING A DEVICE

(75) Inventors: Robert Zubik, Miami, FL (US); Charles Raymond Shambaugh, Jr., Coral Gables, FL (US)

(73) Assignee: Advanced Test Products, Inc., Miramar, FL (US)

( * ) Notice: Subject to any disclaimer, the term of this patent is extended or adjusted under 35 U.S.C. 154(b) by 0 days.

(21) Appl. No.: 10/744,104

(22) Filed: Dec. 24, 2003

(65) Prior Publication Data
US 2005/0144803 A1  Jul. 7, 2005

(51) Int. Cl.⁷ ............................................. F26B 19/00
(52) U.S. Cl. ......................................................... 34/85
(58) Field of Search ............................... 34/80, 82, 85, 34/86

(56) References Cited

U.S. PATENT DOCUMENTS

| | | | | |
|---|---|---|---|---|
| 3,302,449 A | * | 2/1967 | Roberts | 73/40.7 |
| 3,714,421 A | * | 1/1973 | Josias et al. | 250/381 |
| 5,349,844 A | * | 9/1994 | Lilienfeld | 73/28.01 |
| 5,371,467 A | * | 12/1994 | Jeffers | 324/464 |
| 6,352,393 B1 | * | 3/2002 | Sanders | 406/152 |
| 6,641,561 B1 | * | 11/2003 | Hill et al. | 604/136 |

* cited by examiner

*Primary Examiner*—Stephen Gravini
(74) *Attorney, Agent, or Firm*—Baker & Hostetler LLP

(57) ABSTRACT

A method and apparatus includes a filter positioned with a sample flow path such that it restricts or prevents the passage of foreign materials, liquids or debris into a device such that, if not filtered, the elements harm the operational ability of the device.

14 Claims, 6 Drawing Sheets

METHOD AND APPARATUS FOR RESTRICTING FOREIGN OBJECTS FROM ENTERING A DEVICE

FIELD OF THE INVENTION

The present invention relates generally to filtering. More particularly, the present invention relates to preventing or restricting the flow of particles liquids from entering a device and interfering with its operational ability.

BACKGROUND OF THE INVENTION

Electronic refrigerant leak detectors typically include a power supply, such as a replaceable or rechargeable battery, one or more sensing devices (sensors), a printed circuit board and a sample path assembly for drawing air into or across the sensing device. The sample path of most electronic refrigerant leak detectors start at a flexible hollow tube of varying length called a goose-neck probe. Most devices have the sensor at the end of the probe and referred to it as a tip. The free end of the probe is positioned where the operator wants to take an air sample. The sample of air is drawn into the free end of the probe, through a filter, and then across or past the sensing device before being exhausted from the detector. The detector generally has some means for drawing the sample of air along the sample path, for example a fan or pump.

Currently available electronic refrigerant leak detectors which use the "heated diode" type of sensor include the "D-TEK," manufactured by Leybold-Inficon, headquartered in East Syracuse, N.Y.; "The Informant," manufactured by Bacharach, headquartered in Pittsburgh, Pa.; and the H10Xpro "Top Gun," manufactured by Yokogawa Corporation of America, headquartered in Newnan, Ga. Each detector has a gooseneck probe extending some length from the detector body and a means for drawing an air sample through the probe. The air sample is drawn through or across the sensor, which is electronically connected, to a printed circuit board that is disposed within the interior of the detector body.

The D-TEK uses a centrifugal fan surrounded by a shroud to draw air through a probe. One end of the flexible goose-neck probe is glued to the shroud while the free end extends about 16 inches from the detector body. A sensor is located within the free end of the flexible probe. The fan draws the air sample through the free end of the probe, across the sensor, through the remaining length of the probe and into the shroud before it is exhausted from the fan. Signals from the sensor are transmitted to the printed circuit board via electrical wires inserted into the probe and traveling the length of the probe from the sensor to the printed circuit board. The wires are inserted through a rubber plug that seals the shroud where the probe is attached so that leaks around the wires are minimized. A probe tip, attached to the free end of the flexible probe, encloses the sensor. The sample flow rate across the sensor is approximately 35 standard cubic centimeters per minute (SCCM).

Unfortunately, this construction has several disadvantages concerning the manufacture and use of the detector. The relatively low flow rate across the sensor results in a low sensor sensitivity, a longer response time and a longer clearing time (the amount of time required to purge the sample path assembly and the sensor of previously analyzed gas so that a new sample can be taken and analyzed). The flexible probe is glued to the fan shroud, which makes the replacement of a damaged flexible probe difficult and time consuming. The wires connecting the sensor to the printed circuit board are inside the flexible probe, and hence, obstructs the flow path between the probe tip and the fan, potentially resulting in an unquantifiable and unpredictable resistance to the flow of the air sample through the flexible probe, ultimately causing an inconsistent sample flow across the sensor from one use to the next and from one detector to the next. Besides obstructing the flow path, the length of the wires connecting the sensor and the printed circuit board increases the electrical resistance of the wires, increasing demand on the battery and reducing the operating time of the detector without changing batteries or recharging the existing battery. Finally, inserting wires through the small diameter flexible tubing of the flexible probe, sealing the flow path around the wires, and gluing the flexible probe to the fan shroud all increase the difficulty and time required to manufacture the sample path assembly of the detector and to replace the probe or fan if either is damaged.

Like the D-TEK, "The Informant" uses a fan surrounded by a shroud to draw air through a 20 inch flexible probe. One end of the flexible probe is glued to the shroud and the free end is covered by a probe tip. The sensor is located within the free end of the flexible probe. The sensor is covered by the probe tip and a filter. Wires connecting the sensor to the printed circuit board are routed through the shroud and into the interior of the flexible probe. A flexible sealant is used to seal the shroud and flexible probe around the wires. The typical flow rate is approximately 50 SCCM. The Informant has many of the same disadvantages as the D-TEK. In addition, the use of a flexible sealant increases the time for manufacture because the sealant must be "cured" to create a usable seal.

The "Top Gun" detector offers a different approach to constructing a sample path assembly for an electronic refrigerant leak detector. The sensor is connected directly (i.e., is soldered) to the printed circuit board, eliminating the wires found in the flow paths of the D-TEK and The Informant. A flexible probe is approximately 16 inches long and is removably attached to the detector body. A rotary vane pump draws air through the flexible probe at a flow rate of approximately 250 SCCM. The air sample travels through the flexible probe, into the inlet of the rotary vane pump, through the pump to the outlet of the pump, and through 'T' split before encountering the sensor. The air sample from the outlet of the pump is split into two paths at the 'T' split—one path is exhausted from the detector and one path continues to the sensor. Thus, while the flow rate through the flexible probe and rotary vane pump is about 250 SCCM, the actual flow rate of the air sample across the sensor is considerably less and is approximately equivalent to the flow rate of the air sample across the sensors in the D-TEK and The Informant.

The removable flexible probe of the Top Gun, which makes replacement easy, is advantageous over the D-TEK and the Informant. Furthermore, unlike the D-TEK and The Informant, there are no wires traveling the length of the probe to connect the sensor to the printed circuit board. This results in a reduced demand on the battery and an unobstructed flow through the flexible probe. Unfortunately, however, the construction of the sample flow path assembly of the Top Gun presents other disadvantages, most notably the inaccessibility of the sensor, which is fixedly attached to the printed circuit board located inside the detector. This inaccessibility makes replacement of the sensor extremely difficult. Another disadvantage is the placement of the sensor on the outlet side of the pump, which introduces potential mixing problems associated with the air sample within the pump, and an increase in the clearing time. Further, because of the flow split, the increased flow rate through the flexible probe results in an increased demand on the battery by the pump without an appreciable increase in sensor sensitivity. The reduced flow rate across the sensor is a necessary component of the "Top Gun" design. Otherwise, the sensor may be damaged if subjected to the full, high, flow rate. Finally, the additional tubing within the detector body required for the 'T' split increases the number of steps needed to manufacture the flow path assembly, thereby increasing the difficulty and time required.

For greatest detector efficiency, the sensitivity of the sensing device (sensor) must be maximized to an optimum level, the response time of the sensing device should be minimized, and the time needed to clear the detector of already sampled gas (the clearing time) must be minimized, all while maintaining a reasonable demand on the power supply (usually measured in terms of battery life). One, way to maximize the sensitivity of the sensing device is to increase the flow rate of the air sample flowing across or past the sensing device. The response time can be minimized by shortening the sample path between the probe tip and the sensing device and/or increasing the flow rate so the sampled air arrives at the detector more quickly. The clearing time may be minimized by increasing the flow rate of the air. Battery life may be maintained in a variety of ways, including shortening the signal path between the sensing device and electronic circuit, thereby reducing the resistance losses of the wires connecting the sensing device to the electronic circuit, or by reducing the demand placed on the battery by the pump or the fan, either by operating at a lower flow rate or providing a more efficient sample path.

Thus, mindful of the disadvantages of many of the currently available electronic refrigerant leak detectors, a need exists for a gas leak detector that has a sample flow path that maximizes sensing device sensitivity, minimizes response time, and minimizes clearing time, all while maximizing battery life and reducing manufacturing difficulty and time. However, increasing the sample flow rate results in disadvantages as well. By increasing the flow rate, debris and/or liquid can be drawn into the leak detector. This foreign matter can and does affect the operational ability of the leak detector. Liquids can alter the performance of the sensor while debris causes flow problems.

Accordingly, it is desirable to provide a method and apparatus that provides a greater sample flow rate while preventing or restricting the foreign debris or matter that is drawn into the device due in part to the greater sampling rate.

SUMMARY OF THE INVENTION

The foregoing needs are met, to a great extent, by the present invention, wherein in one aspect an apparatus is provided that in some embodiments includes an enclosed flow path, which contains a filter such that it excludes elements or liquids from interfering with the operation of a device. The enclosed flow path contains a filter that is located, in the preferred embodiment, nearest the point of entry for a sample of air to pass through the device.

In accordance with one embodiment of the present invention, an apparatus for restricting the entry of foreign materials into an encased flow path comprises an input and an output and a restrictor positioned within the flow path to prevent the entry of the foreign materials. A further element can include attaching a tip to the encased flow path.

In accordance with another embodiment of the present invention, a method for restricting the entry of foreign materials into a device includes drawing a sample of air into a flow path and restricting foreign materials into the flow path with an adapter connected to the flow path, the adapter includes a filter membrane. The membrane in this embodiment can be an acrylic copolymer. Additionally, a tip can be placed at the entry point of the sample of air. The filter tip is attached to the adapter.

In accordance with yet another embodiment of the present invention, a system for restricting the entry of foreign materials into a sample flow path includes means for drawing a sample of air into a flow path and means for restricting foreign material from traveling too far down the flow path. The means for restricting is configured to be positioned at an entry point of the flow path. In this embodiment, the means for restricting can be an acrylic copolymer. Additionally, the means for restricting can be attached to a tip.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
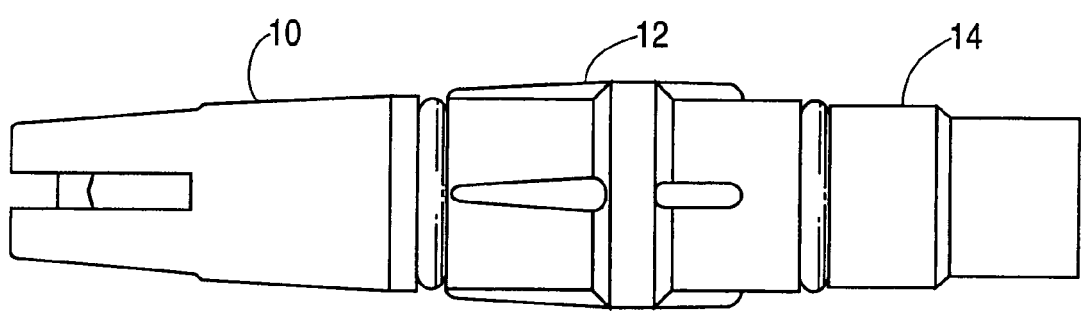
FIG. 1 is a view illustrating a preferred embodiment of the present invention.

The invention will now be described with reference to the drawing figures, in which like reference numerals refer to like parts throughout. An embodiment in accordance with the present invention provides a filtering mechanism or filter that prevents foreign matter, debris or liquid from entering a device such that it prevents these items from interfering with the operational ability of the device. The present invention can also include a tip attached to the filtering mechanism.

An embodiment of the present inventive apparatus and method is illustrated in FIG. 1. FIG. 1 is includes three parts that are all connected or linked to a leak detector, combustible or refrigerant. The parts are a tip 10, encased flow path 12 or adapter and probe 14. The preferred embodiment attaches all three in series. However, the tip 10 is not an essential for the operation of the encased flow path 12.

The tip 10 serves, in the preferred embodiment, as the point from which a sample of air is drawn up into the flow path and ultimately to the device. The sample of air is then processed by the leak detector to determine whether a specific gas or agent is present in the area around where the sample of air was drawn. After being drawn through the tip, the sample of air passes through the encased flow path 12. From here, the sample of air then passes to the probe 14 and then into the leak detector.

Figure 2:
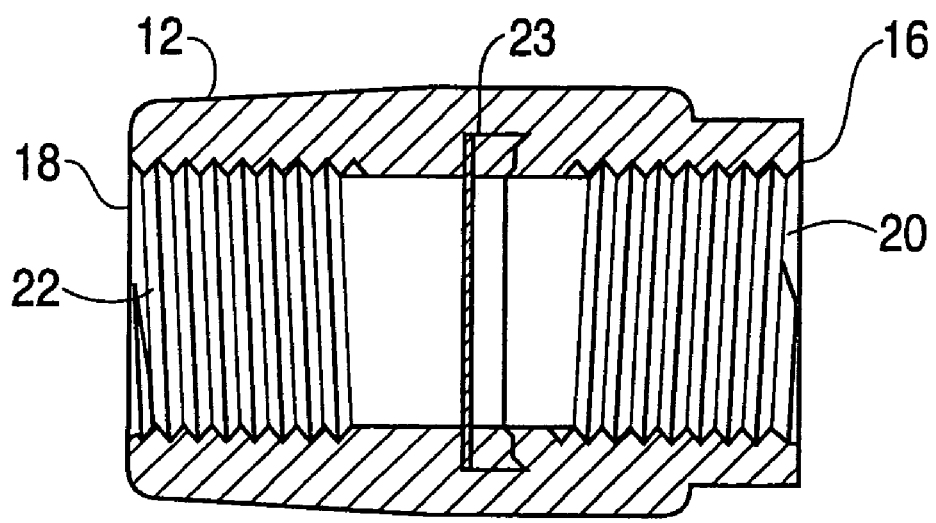
FIG. 2 is a cutaway view of a filtering mechanism according to a preferred embodiment.

FIG. 2 is a cut away view of the side portion of the encased flow path 12, which includes a first end 16 and a second end 18. Each of the ends 16,18 contains threads 20, 22 such that it can be connected to the tip 10 at the first end 16 and the probe 14 at the second end 18. As previously noted, the tip 10 does not need to be connected to the encased flow path 12 to work.

Positioned within the encased flow path 12 is a filtering membrane 23, which serves as the basis to keep foreign matter, debris or liquid from entering the device or leak detector. At the point the sample is drawn through the tip 10 into the encased flow path 12, the debris is prevented or restricted by the filtering membrane 23 from advancing an further advancing down the flow path and towards the electronic components of the leak detector.

Figure 3:
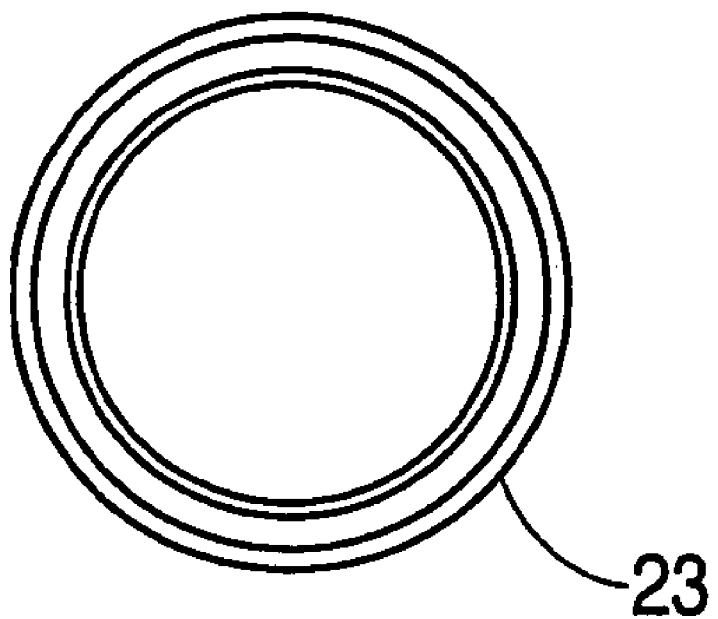
FIG. 3 illustrates the filtering mechanism according to a preferred embodiment of the invention.

FIG. 3 illustrates the filtering mechanism according to a preferred embodiment of the invention. The filtering membrane 23 is placed approximately in the center of the encased flow path 12 as depicted in FIG. 2. One of the reasons for this is that it enables the encased flow path 12 to be attached to an existing leak detector such that it can be positioned at the or near the entry point of the flow path. An operator of a device, such as leak detector, needs only to buy the encased flow path 12 off the shelf and attach to his existing device. The present invention is not limited though by the attachment of the encased flow path 12. It is possible to place the filtering membrane 23 in a more permanent location such as in the probe 14.

In the preferred embodiment, the filtering membrane 23 is a VERSAPOR® R such as that offered by Pall Corporation. The thickness of the filtering membrane 23 is in the range of 0.0047 to 0.0100 inches, normally 0.008 with a pore size of 5 microns. The benefit of these sizes is that it works best in the environment to which a leak detector is used. The size used is best at restricting the liquids or water vapors from entering the device. It is within the scope of this invention to use varying thickness and pore size for the filtering membrane 23. VERSAPOR® R is an acrylic or modified acrylic copolymer cast on a non-woven nylon support. Additional embodiments use alternate filtering membranes 23 such as Versapor® and a Versapor® TR. Further additional embodiments include GoreTex® and others make similar hydrophobic and oleophobic membranes. These membranes are optimized for automotive chemicals and is tougher and does not have to be oriented with the membrane side towards the air inlet. These filters are Teflon® based and optimized for oil and other chemicals.

Figure 4:
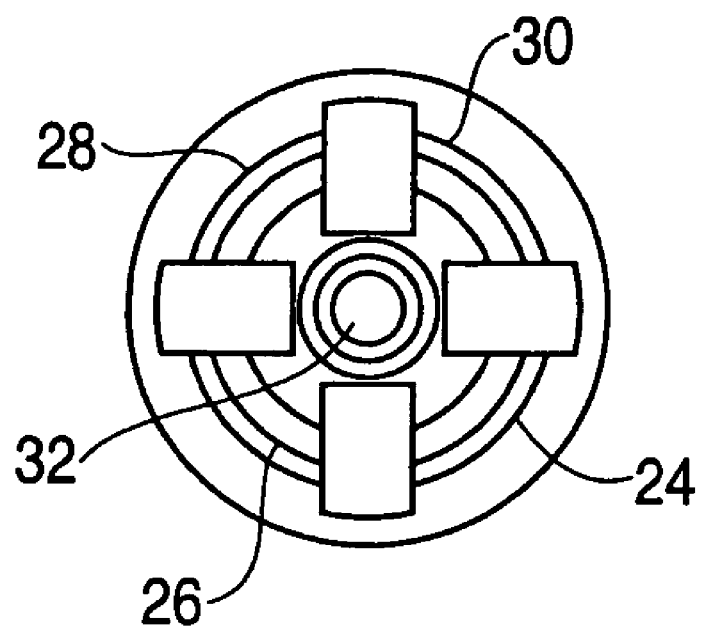
FIG. 4 is a top-view of the tip according to a preferred embodiment of the invention.

FIG. 4 is a top-view of the tip according to a preferred embodiment of the invention. As noted, it is possible and within the scope of this invention to attach the encased flow path 12 to a tip 10. An advantage of the tip 10 is that it aids in preventing additional debris such as leaves or other large size material from entering the flow path. Without the tip 10 and with the encased flow path 12, the leaves are impeded or trapped by the filtering membrane 23 but hamper airflow through encased flow path 12. Note that attaching a tip 10 is not necessarily needed. In another embodiment, the first end 18 of the encased flow path 12 is tapered such that it narrows the opening flow path. This design, similar to tip, enables larges particles to be trapped prior to being brought in against the filtering membrane 23. A downside to drawing large particles towards the filtering membrane 23 is that it prevents a true sample from being analyzed. Therefore, it is possible that agents, for which the device is testing, are present but go undetected because the larger particles, trapped at the filtering membrane 23, prevent airflow from reaching the detector.

Figure 5:
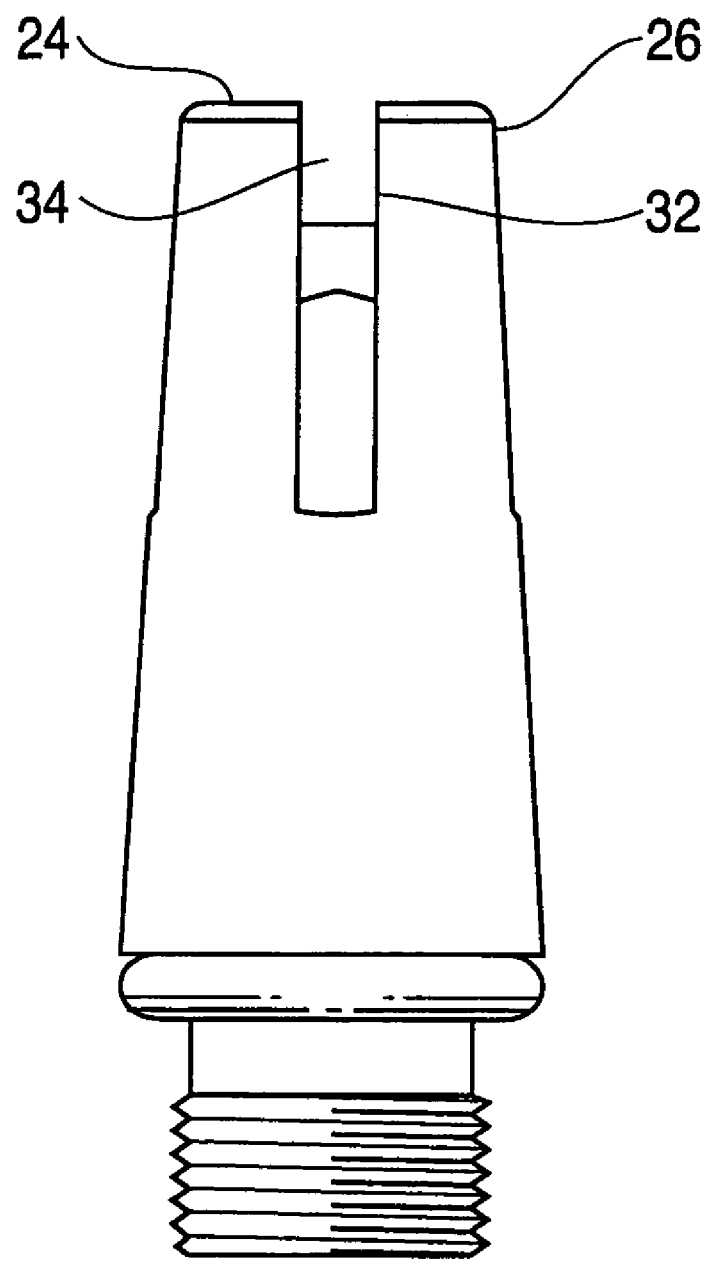
FIG. 5 is a side-view of the tip according to a preferred embodiment of the invention.

FIG. 4 details four castellated features 24, 26, 28, 30 surrounding the sample flow point of entry 32. As seen in FIG. 5, the point of entry 32 is recessed below the castellated features 24, 26, 28, 30. By recessing the point of entry 32, it aids in not drawing in unwanted materials, debris or liquids. For example, if a technician is blindly placing a leak detector behind a piece of equipment, he could inadvertently place the tip in a liquid collection area. Without the recessed point of entry 32, the liquid is drawn into the device. With the recessed point of entry 32, the liquid is less likely to be drawn into the device because it is able to pull in air through a castellated opening 34. Without this opening, a direct suction and path is created such that the liquid is drawn into the device.

The recessed point of entry 32 further aids, as noted previously, in keeping larger debris from entering the flow path at all. For example, a loose piece of paper or leaf inadvertently drawn in by device is usually stopped by the castellated features 24, 26, 28, 30. It is unlikely that they are drawn in towards the recessed point of entry 32 such that it enters the flow path or blocks the path all together.

Figure 6:
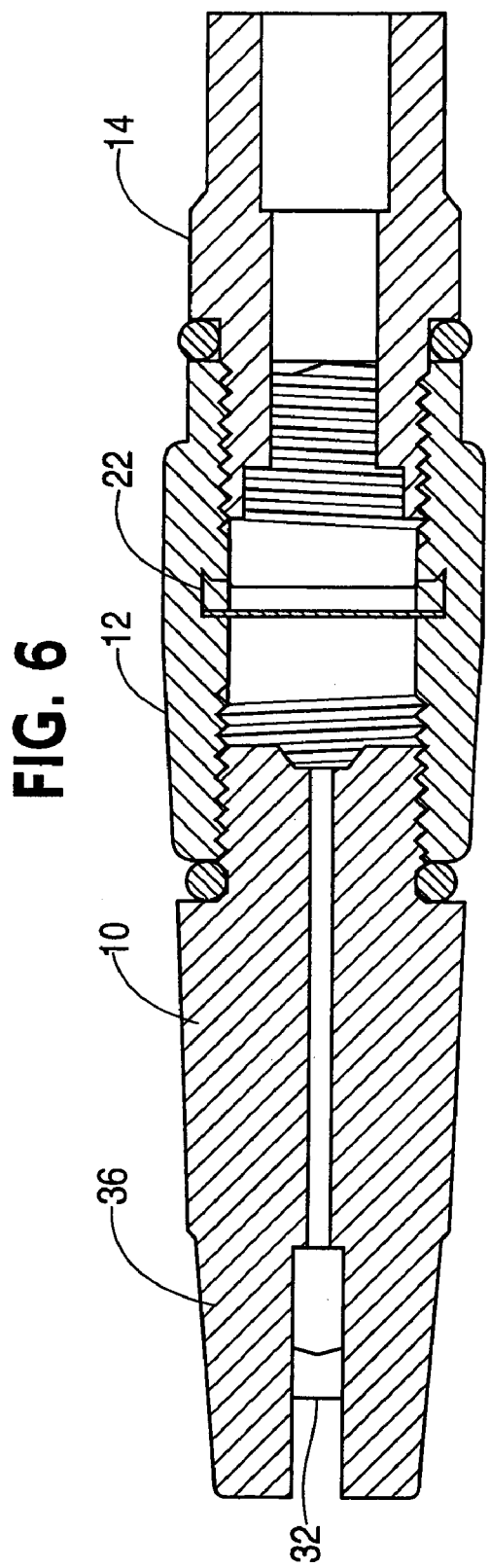
FIG. 6 is a cut-away-view of the present invention according to a preferred embodiment.

FIG. 6 is a cut-away-view of the present invention according to a preferred embodiment. Similar to FIG. 1, the tip 10 is attached to the encased flow path 12, which is attached to the probe 14. This figure details that at the point of entry 32, a sample of air is drawn into the flow path 36. Note in this figure that the point of entry 32 is recessed by the castellated features 24,26,28,30.

After passing through the flow path 36, the sample of air is passed to the encased flow path 12, where it then passes to through the filtering membrane 23. Upon exiting the filtering membrane 23, the sample of air passes through the probe 14 and onto the device to where it is analyzed.

The many features and advantages of the invention are apparent from the detailed specification, and thus, it is intended by the appended claims to cover all such features and advantages of the invention, which fall within the true spirit, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for restricting the entry of foreign materials into a flow path, comprising:
   an encased flow path comprising an input and an output;
   a restrictor positioned within the flow path, wherein the restriction is configured to permit air to pass through the restrictor as well as prevent foreign materials from proceeding beyond the position of the restrictor; and
   a tip linked to the input of the encased flow path, wherein the tip comprises a first end and second end, wherein the first end is castellated such that it recesses an entry point, the tip is configured to pass a sample of air passes through the entry point and into the encased air flow path through the second end.

2. The apparatus as in claim 1, wherein the restrictor is a filter.

3. The apparatus as in claim 2, wherein the filter is a membrane.

4. The apparatus as in claim 3, wherein the membrane is an acrylic copolymer.

5. The apparatus as in claim 3, wherein the membrane is a modified acrylic copolymer.

6. The apparatus as in claim 3, wherein the membrane is a modified acrylic copolymer cast on a non-woven nylon support.

7. The apparatus as in claim 1, wherein the restrictor is positioned in approximately in the center of the air flow path.

8. The apparatus as in claim 1, wherein the apparatus is attached at one end to a leak detector.

9. The apparatus as in claim 8, wherein the one end is the entry point for a portion of atmospheric air to enter the device.

10. A method for restricting the entry of foreign materials into a device, comprising:
    drawing a sample of air into a flow path through a filter tip comprising a first end, which is castellated, a second end and an inlet, wherein the inlet is recessed from the first end;
    restricting foreign materials into the flow path with an adapter connected to the flow path, the adapter comprises a filter membrane, which is configured to allow the sample of air to pass through but prevent the foreign materials from proceeding past the filter membrane.

11. The method as in claim 10, wherein the membrane is an acrylic copolymer.

12. A system for restricting the entry of foreign materials into a sample flow path, comprising:
    means for passing a sample of air into a flow path, wherein the means for passing is located near an entry part of the flow path; and
    means for recessing the means for passing such that means for recessing extends beyond the means for passing;
    means for restricting foreign material from traveling too far down the flow path, the means for restricting is configured to be positioned at an entry point of the flow path and permit the sample of air to pass through.

13. The system as in claim 12, wherein the means for restricting is attached to a tip.

14. The system as in claim 12, wherein the means for restricting is an acrylic copolymer.

* * * * *